United States Patent Office 2,942,970
Patented June 28, 1960

2,942,970
PRODUCTION OF HOLLOW THERMAL ELEMENTS

Claus G. Goetzel, Hastings on Hudson, and John L. Ellis, White Plains, N.Y., assignors to Sintercast Corporation of America, Yonkers, N.Y.

Filed Apr. 19, 1955, Ser. No. 502,502

8 Claims. (Cl. 75—200)

The present invention relates to the production of hollow bodies and in particular to the production of hollow thermal elements such as turbine blades, buckets, nozzle vanes, and the like, which in use are subjected to high stresses at high operating temperatures under corrosive conditions.

The rapid development of super aircraft flying at several times or more the speed of the sound has raised considerably the temperature requirements of thermal elements employed in aircraft heat engines. Whereas thermal elements were previously designed to operate at the relatively high temperature level of the order of about 815° C. (or about 1500° F.), such elements have not always been too satisfactory at higher temperatures, even when made from certain wrought or cast nickel-base or cobalt-base alloys of the so-called "super-alloy" type enriched with matrix-hardening alloying ingredients such as chromium, molybdenum, tungsten, etc. and/or with precipitation hardening elements such as aluminum, titanium, zirconium, etc.

A very promising material which was developed to meet the need comprised titanium carbide dispersed as fine grains through a metal matrix formed essentially of a heat resistant alloy, such as a nickel-base or cobalt-base alloy. It was found that with this material, which was refractory in nature and yet which had metallic properties, operating temperatures could be raised still higher, even higher than the elevated temperatures which could be satisfactorily met by most "super-alloys," e.g. about 900° C. to 1000° C. (about 1650° F. to 1830° F.).

The desire of further increasing the speed of aircraft and of further increasing the efficiency of heat engines has resulted in still higher temperature requirements of the order or about 1000° C. to 1100° C. (about 1830° F. to 2000° F.) and higher. Because of the foregoing, it has become more apparent that the problem of providing thermal elements to meet rigid high temperature requirements is one involving heat exchange as well as heat resistance.

Attempts have been made to solve the problem by producing hollow thermal elements, e.g. turbine blades, from cast or welded or otherwise fabricated wrought alloy materials with the aim of keeping the temperature of the element in service as low as possible by passing a coolant through the hollow portions to remove heat building up on the surface of the element. However, such elements were limited in use by the quality of the casting of the weld or the fabricated component in which premature failure was likely to occur.

A hollow thermal element is now proposed which is not only heat resistant at elevated temperatures of the order of about 1000° C. (about 1830° F.) and higher but which also functions adequately as a heat exchanger, thereby enabling its use at even higher temperatures.

It is the object of the invention to provide a method for the production of heat resistant hollow thermal elements, such as hollow blades, by employing a combination of powder metallurgy and interstitial casting, also known as infiltration.

Another object is to provide a method for the production of heat resistant hollow thermal elements from high melting point refractory materials and a ductile binder metal.

Still other objects will become more apparent when taken in conjunction with the description.

Broadly, the invention comprises the production of hollow bodies or thermal elements from high melting refractory materials having a melting point in excess of that for iron, that is in excess of about 1535° C. (about 2795° F.). The preferred refractory materials employed in producing the hollow elements comprise the metals chromium, molybdenum, tungsten, vanadium, tantalum, columbium, titanium and zirconium, mixtures of at least two of these metals, their refractory compounds and mixtures thereof. The compounds of these metals include their carbides, silicides, nitrides and borides.

In carrying out one embodiment of the invention, a coherent porous skeleton body of hollow configuration is formed from the refractory material around a substantially high melting inert core material, e.g. an inert material having a melting or softening point in excess of 1700° C. (about 3100° F.). The pores of said skeleton body are then infiltrated with a matrix-forming metal at an elevated temperature below the melting point of the refractory material but above the melting point of the infiltrant metal, usually up to about 250° C. above the melting point. During this process, the cored hollow body is supported exteriorly by a substantially inert refractory, for example by embedding the skeleton and the contained core in alumina, beryllia, thoria, zirconia, stabilized lime, etc. Upon completion of infiltration, the body is cooled down to below the solidification temperature and then separated from the core and refractory support.

The production of most turbine blades presents problems due to their complex shape. The blades have a twisted foil shape and in the case of hollow blades the cross section may reduce in overall size from the root of the blade to the tip of the foil. Such tapered and twisted blades are desirable for aerodynamic reasons because of the minimum weight at the foil tip where, in the case of a rotating blade, the centrifugal force is of high magnitude.

In producing such a complex shape, an expendable core may be employed having an external configuration conforming substantially to the desired internal configuration of the hollow blade. The core may comprise graphite machined or formed with a twisted and/or tapered foil shape and coated with a thin protective layer of inert refractory, for example thoria, beryllia, etc. The foil surface of the core is then provided with a layer of refractory material of adequate thickness, for example, finely divided titanium carbide powder mixed with up to about 25% of a binder metal powder, such as nickel, cobalt or iron. The layer may be applied in several ways, depending on the degree of porosity desired in the hollow skeleton body. Thus, the refractory powder material may be sprayed onto the core by a metal powder gun or powder spraying torch, or deposited on the surface as a liquid slurry or paint and then dried, or slip cast about the core in a confining mold whose internal configuration conforms substantially to the desired external configuration of the hollow body.

The porosity of the skeleton may range from about 30% to 70% of the total volume. Spraying may be employed to produce porosities ranging from about 30% to 60% by volume while porosities in the order of about 40% to 70% by volume may be obtained by using the slurry, paint or slip cast methods.

After refractory material has been applied to the core, the material is sintered together by heating at an elevated temperature under substantially inert conditions. If the refractory material has been deposited on the core by slip casting or painting, a slow heating cycle is employed to evaporate or decompose the vehicle in the refractory powder material without disturbing the layer of refractory material. The decomposition or evaporation temperature of the vehicle usually ranges up to about 500° C. The sintering temperature thereafter may range from about 1200° C. to 1700° C. Inert conditions for sintering may be obtained by utilizing certain so-called reducing gases such as carbon monoxide or hydrogen which are considered inert for the purpose. Inert conditions may also be achieved by employing sub-atmospheric pressure ranging down to high vacuum. In this case it is preferred that the sintering of the skeleton be carried out in a vacuum not exceeding 100 microns of mercury column, preferably down to below 5 microns, e.g. in the range of about 0.001 to 0.1 micron.

Once the core-supported porous skeleton has been strengthened, its pores are then infiltrated with a matrix forming heat resistant metal, such as a nickel-base alloy containing about 13% to 15% chromium, 6% to 8% iron and the balance substantially nickel. One way of achieving this is by enveloping the outer surface of the core-supported skeleton with the infiltrant metal either by spraying the metal thereon by a metallizing gun or torch or by intimately wrapping a ductile strip of the metal about the skeleton. The amount of infiltrant metal employed will depend upon the porosity of the skeleton. The assembly is adequately supported by an inert refractory and then heated under substantially inert conditions (preferably vacuum) above the melting point of the matrix-forming alloy (e.g. up to about 250° C. above the melting point), generally in the range of about 1200° C. to 1700° C. (preferably about 1300° C. to 1500° C.). It is preferred that the heating of the body to this temperature be done slowly until the body reaches a uniform temperature of about 900° C. to 1300° C. and held there for a time (e.g. ½ to 4 hours) to permit reduction, decomposition or removal of oxides and other impurities. The temperature is then brought up gradually to the infiltration temperature until the body is uniformly heated throughout.

The matrix-forming metal penetrates and fills the skeleton interstitially by means of capillary action. The time for this process may range from about 5 minutes to 6 hours or more. After the pores have been filled, the hollow body is cooled and then separated from the expendable core and/or the refractory support. In the case of a graphite core, this is achieved by heating the infiltrated body and the contained core in an atmosphere oxidizing to graphite. Thus, the graphite is burned away or partially burned to loosen it for subsequent removal. The heating temperature for removing the graphite core may range from about 800° C. to 1100° C. If stabilized lime is employed as a core, it is removed by exposing it to moist air or hot water. A core of beryllia or alumina or zirconia may be removed by sand blasting or by grit blasting with silicon carbide.

One convenient method of employing slip casting for the production of hollow thermal elements is to prepare a plaster mold permeable to a liquid and having a cavity which conforms in shape to the configuration of the thermal element. Successive layers of a liquid slurry containing a fine suspension of refractory material, e.g. titanium carbide, are then deposited on the inner walls of the plaster mold which is porous and the liquid of the slurry removed through the porous walls of the mold leaving a thin layer of refractory material. The process is repeated for successive layers until sufficient thickness is obtained which may range from about 1/32 to about 1/8 of an inch, depending upon the requirements of the hollow thermal element. The mold with the deposited layer is then dried to remove residual liquid and then fired under inert conditions, e.g. in a vacuum or in the presence of an inert gas, with the object of effectively sintering together the refractory particles to impart strength and coherence to the hollow skeleton body for subsequent processing operations. The skeleton body is then removed from the plaster mold and embedded or encased in an inert refractory support. If necessary, an inert refractory oxide may be used as a support on the inside as well as the outside of the hollow body. After adequately supporting the hollow skeleton body, a portion of the body is contacted by a molten matrix-forming alloy metal which is then allowed to flow into or infiltrate the interstices of the body.

In producing a hollow skeleton body around a core material, the body is apt to become stressed due to shrinkage of the skeleton around the core on cooling or due to differences in expansivity of the refractory support and the skeleton on heating up to temperature. A preferred method for minimizing this effect is to apply first to the core a thin coating of metal, say up to about 0.01″ thick. Such metal may comprise nickel, cobalt or iron, or a heat resistant alloy based on one or more of these metals. As described hereinbefore, the core is then provided with a porous layer of the refractory material, e.g. titanium carbide, which is then sintered to form a strong porous skeleton body. At least a portion of the sintering is carried out above the melting point of the underlying coating of metal which when molten is absorbed into the porous structure of the hollow skeleton, leaving a small space between the core and the hollow body, thus enabling the latter to shrink freely without setting up substantial stresses in the skeleton structure during sintering and also during the infiltration step and subsequent treatments. The underlying metal coating can be deposited on the core by spraying, painting, vacuum-vapor deposition or by the decomposition of a metal halide or a metal carbonyl.

Of course, the metal coating on the core may itself be the matrix-forming metal in which case enough of it would have to be applied to the core to at least fill all the pores in the skeleton. Thus, the core would be coated, for example, with a heat resistant nickel-base alloy. The metal coated core would then be provided with the required amount of refractory material as a coherent porous skeleton, such as finely divided titanium carbide, the whole disposed in a support bed of refractory oxide and heated to a sintering temperature under substantially inert conditions below the temperature at which liquid phase might be formed between the skeleton and the matrix metal until a strong coherent skeleton body is produced. The temperature is thereafter raised to above the melting point of the matrix metal to cause it to infiltrate or flow interstitially into the pores of the hollow skeleton. Upon completion of infiltration, the body is cooled below the solidification temperature of the liquid phase and then separated from the refractory support and the core.

Other methods of forming a hollow skeleton body about a core material for subsequent infiltration treatment comprises first forming a hollow shape of refractory material by the extrusion, pressing, or injection molding of plastic bonded refractory material. The refractory material in the finely divided form containing up to about 25% binder metal powder is mixed uniformly with about 5% to 30% by volume of a plastic, ejected, pressed or extruded into the desired hollow shape and then cured or indurated into a rigid body.

In extrusion molding the pressure may range from about 5,000 to 50,000 pounds per square inch. In injection molding, pressures of 1,000 to 15,000 pounds per square inch have been found adequate.

The rigid hollow body thus-produced is disposed within a confining bed of a refractory oxide powder, such as for example, powdered zirconia, which is vibrated on a jolting table to settle the powder within the hollow body exposed. Thus, the core is in effect being formed in situ while the powdered zirconia is packed by vibration until an adequate internal and external support is built up against the wall of the body. The packed hollow body is then subjected to a low temperature heating cycle (for example up to about 500° C.) to decompose carefully the plastic binder and remove it. After the plastic binder has been removed, the porous body remaining is then heated up to a sintering temperature falling within the range of about 1200° C. to 1700° C. under substantially inert conditions to strengthen the porous skeleton for the subsequent infiltration treatment. After the skeleton has been strengthened, it is removed and separated from the refractory powder support and the surfaces cleaned by grit blasting. The sintered skeleton body is again supported by refractory oxide, then contacted with a matrix-forming infiltrant metal and finally heated under substantially inert conditions to a temperature above the melting point of the infiltrant metal and held at this temperature until the molten infiltrant penetrates interstitially the pores of the hollow skeleton. After cooling, the hollow body is then separated from the refractory support and finished into a hollow thermal element.

The plastic binder which may be referred to as a "fugitive" binder, since it is driven out during the processing, may comprise polystyrene, polymethacrylates, phenol-formaldehyde, cellulose acetate, cellulose acetate-butyrate, ethyl cellulose, vinylidene chloride, vinyl acetate, polyvinyl alcohols, cellulose nitrate, etc. The refractory powder material and plastic mixture may also be injection molded and cured to form the desired hollow configuration.

Still another method of producing a hollow thermal element comprises utilizing a core of matrix-forming infiltrant metal upon which is deposited the refractory material into which the infiltrant is subsequently absorbed. The core may be hollow or solid depending upon the requirements given below. One embodiment comprises casting a plastic-containing mixture onto the hollow or solid core followed by curing. If a refractory compound is employed, e.g. titanium carbide, it is first mixed with up to about 25% binder metal such as nickel, cobalt or iron. The assembly is disposed in a confining bed of refractory oxide powder support and the powder densified against the wall of the body by vibration on a jolting table. In the case of a solid core, the powder is densified against the outside wall while in the case of a hollow core the powder is densified against the inside and outside wall. The assembly is then subjected as before to careful heating at a temperature up to about 500° C. to drive off the plastic followed by sintering under inert conditions at a sintering temperature below the temperature of the liquid phase formation of the skeleton with the matrix-forming infiltrant metal until the skeleton is strengthened. Thereafter the temperature is raised above the melting point of the infiltrant metal to enable it to enter the pores of the hollow skeleton. The volume of the infiltrant metal which depends upon its dimensions must be sufficient in the liquid state to fill all the pools and interstices of the skeleton. Upon completion of the process, the space previously occupied by the infiltrant enables the infiltrated hollow body to shrink on cooling without setting up undue stresses. After cooling to ambient temperature, the infiltrated hollow body is then separated from the refractory support and finished into a hollow thermal element.

By matrix-forming metal is meant a metal which, upon infiltrating a porous skeleton body, forms the matrix thereof through which the material of the skeleton is distributed.

The matrix-forming infiltrant metals which may be employed include at least one metal from the group nickel, cobalt and iron, and heat resistant alloys based on these metals, e.g. heat resistant nickel-base, cobalt-base and iron-base alloys.

Examples of nickel-base matrix-forming alloys include: 80% nickel and 20% chromium; 80% nickel, 14% chromium and 6% iron; 15% chromium, 7% iron, 1% columbium, 2.5% titanium, 0.7% aluminum and the balance nickel; 58% nickel, 15% chromium, 17% molybdenum, 5% tungsten and 5% iron; 95% nickel, 4.5% aluminum and 0.5% manganese, etc.

Examples of cobalt-base alloys which may be employed as matrix-forming metals include: 69% cobalt, 25% chromium and 6% molybdenum; 65% cobalt, 25% chromium, 6% tungsten, 2% nickel, 1% iron and other elements making up the balance of 1%; 56% cobalt, 10% nickel, 26% chromium and 7.5% tungsten; and 51.5% cobalt, 10% nickel, 20% chromium, 15% tungsten, 2% iron and 1.5% manganese, etc.

Some of the iron-base matrix-forming alloys include: 53% iron, 25% nickel, 16% chromium, and 6% molybdenum; 74% iron, 18% chromium and 8% nickel; 86% iron and 14% chromium; 82% iron and 18% chromium; 73% iron and 27% chromium, etc.

The matrix-forming metal or alloy may contain up to about 30% by weight of a metal selected from the group consisting of chromium, molybdenum and tungsten, the sum of the metals of said group preferably not exceeding 40%, substantially the balance being at least one metal selected from the group consisting of iron, cobalt and nickel, the sum of the group metals being preferably at least about 40% by weight of the matrix-forming alloy. If desired the matrix-forming alloy may also contain up to about 8% total of at least one metal from the group columbium, tantalum and vanadium.

Alloys of the aforementioned types containing effective amounts of well-known so-called strengthening or age-hardening elements, such as zirconium, titanium, aluminum, etc., may also be employed in matrix-forming metals or alloys.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. A method for the production of heat resistant hollow bodies, including turbine blades, buckets, and nozzle vanes, which comprises forming a core of high melting and substantially inert material of melting point above 1700° C. with an external configuration conforming substantially to the desired internal configuration of the hollow body to be produced, providing on said external surface of said core a porous coating comprising finely divided particles of a refractory material selected from the group consisting of chromium, molybdenum, tungsten, vanadium, columbium, tantalum, titanium and zirconium, mixtures of at least two of these metals, their carbides, silicides, nitrides, borides and combinations thereof, subjecting said coated core to a sintering operation at an elevated temperature of between about 1200° C. to 1700° C. to produce a coherent porous skeleton disposing said skeleton in an inert refractory, contacting a portion of said skeleton with a matrix-forming infiltrant metal, infiltrating interstitially the porous skeleton with a molten matrix metal having a melting point below that of the skeleton material at a temperature up to about 250° C. above said melting point, cooling said infiltrated body to below the solidification temperature of the lowest melting phase and then separating the core and the bedding material from the hollow body.

2. A method for the production of heat resistant hollow bodies, including turbine blades, buckets, and nozzle vanes, which comprises forming a core of high melting and substantially inert material of melting point above 1700° C. with an external configuration conforming substantially to the desired internal configuration of the hollow body to be produced, providing on said external surface of said core a porous coating comprising finely divided particles of a refractory material selected from the group consisting of chromium, molybdenum, tungsten, vanadium, columbium, tantalum, titanium and zirconium, mixtures of at least two of these metals, their carbides, silicides, nitrides, borides and combinations thereof, subjecting said coated core to a sintering operation at an elevated temperature between about 1200° C. to 1700° C. to produce a coherent porous skeleton, supporting said skeleton with a substantially inert refractory, contacting a portion of said skeleton with at least one matrix-forming infiltrant metal selected from the group consisting of nickel, cobalt and iron and heat resistant alloys based on at least one of the metals, infiltrating interstitially the porous skeleton with said matrix metal having a melting point below that of the skeleton material at a temperature up to about 250° C. above said melting point, cooling said infiltrated body to below the solidification temperature of the lowest melting phase and then separating the core and inert material from the hollow body.

3. A method for the production of hollow bodies which comprises applying a thin coating of a metal to a core of a high melting substantially inert material of melting point above 1700° C., providing a porous layer of refractory material of melting point above 1535° C. about said metal coated body, sintering said refractory material by heating to an elevated temperature above the melting point of the metal coating to strengthen said porous refractory material and to absorb said metal coating into part of the porous structure, infiltrating interstitially the remaining porous structure of said body at a temperature of about 1200° C. to 1700° C. with a metal of melting point below that of the material of the body, cooling said infiltrated body below the solidification temperature of the lowest melting phase and then separating said core material from the thus-produced hollow body, whereby a substantially stress-free infiltrated hollow body is produced.

4. A method for the production of heat resistant hollow bodies, including turbine blades, buckets, and nozzle vanes, which comprises forming a core of a high melting and substantially inert material of melting point above 1700° C. with an external configuration conforming substantially to the desired internal configuration of the hollow body to be produced, depositing on said core a thin intermediate coating of metal, providing on the surface of said metal-coated core a porous layer of finely divided particles of a refractory material selected from the group consisting of chromium, molybdenum, tungsten, vanadium, columbium, tantalum, titanium and zirconium, mixtures of at least two of these metals, their carbides, silicides, nitrides, borides and combinations thereof, subjecting said refractory material on the core to a sintering treatment at an elevated temperature above the melting point of the intermediate metal coating to cause the absorption of said metal coating into part of the porous layer so as to form a substantially stress-free coherent skeleton body, disposing said sintered hollow body and the contained core in a substantially inert refractory material, contacting a portion of said skeleton with a matrix-forming infiltrant metal, infiltrating interstitially the porous walls of said hollow body with said matrix metal of melting point below that of the material of the body, cooling said infiltrated body to below the solidification temperature of the lowest melting phase and separating said core and said inert refractory material from the infiltrated hollow body.

5. A method for the production of heat resistant hollow bodies, including turbine blades, buckets, and nozzle vanes, which comprises forming a core of a high melting and substantially inert material of melting point above 1700° C. with an external configuration conforming substantially to the desired internal configuration of the hollow body to be produced, depositing on said core a thin intermediate coating of metal selected from the group consisting of nickel, cobalt and iron, providing on the surface of said metal coated core a porous layer of finely divided particles of a refractory material selected from the group consisting of chromium, molybdenum, tungsten, vanadium, columbium, tantalum, titanium and zirconium, mixtures of at least two of these metals, their carbides, silicides, nitrides, borides and combinations thereof, subjecting said refractory material on the core to a sintering treatment at an elevated temperature above the melting point of the intermediate metal coating ranging from about 1200° C. to 1700° C. to cause the absorption of said metal coating into part of the porous layer so as to form a substantially stress-free coherent skeleton body, disposing said sintered hollow body and the contained core in a substantially inert refractory material, contacting a portion of said skeleton with a matrix-forming infiltrant metal selected from the group consisting of nickel, cobalt and iron, and heat resistant alloys based on at least one of these metals, infiltrating interstitially the porous walls of said hollow body with said matrix metal of melting point below that of the material of the body at a temperature up to about 250° C. above said melting point, cooling said infiltrated body to below the solidification temperature of the lowest melting phase and separating said core and said inert refractory material from the infiltrated hollow body.

6. A method for the production of hollow bodies, including turbine blades, buckets, and nozzle vanes, which comprises forming a hollow body of a matrix-forming infiltrant metal of amount sufficient to infiltrate a subsequently formed porous hollow body, providing on the external surface of said hollow body a porous layer of a refractory material selected from the group consisting of chromium, molybdenum, tungsten, vanadium, columbium, tantalum, titanium and xirconium, mixtures of at least two of these metals, their carbides, silicides, nitrides, borides and combinations thereof, supporting said body with a substantially inert refractory material of melting point above 1700° C., subjecting said hollow body assembly to an elevated sintering temperature below the melting point of the underlying infiltrant metal to produce a coherent porous skeleton body, then heating said assembly to a temperature above the melting point of said underlying infiltrant metal, thereby infiltrating interstitially the porous walls of said skeleton body with said infiltrant metal, cooling said infiltrated body to below the solidification temperature of the lowest melting phase and then separating the refractory support material from the thus-produced hollow body, whereby a substantially stress-free hollow body is formed.

7. A method for the production of hollow bodies, including turbine blades, buckets, and nozzle vanes, which comprises forming a hollow body of a matrix-forming infiltrant metal of amount sufficient to infiltrate a subsequently formed porous hollow body, providing on the external surface of said hollow body a porous layer of a refractory material selected from the group consisting of chromium, molybdenum, tungsten, vanadium, columbium, tantalum, titanium and zirconium, mixtures of at least two of these metals, their carbides, silicides, nitrides, borides and combinations thereof, supporting said body internally and externally with a substantially inert refractory material of melting point above 1700° C., subjecting said hollow body assembly to an elevated sintering temperature below the melting point of the underlying infiltrant metal within the range of about 1200° C. to 1700° C. to produce a coherent porous skeleton body, then heating said assembly to a temperature above the melting point of the infiltrant not exceeding about 250° C. above the melting point, thereby infiltrating interstitially the porous walls of said skeleton body with said matrix metal, cooling said infiltrated body to below the solidification temperature of the lowest melting phase and then separating the refractory support material from the thus-produced hollow body, whereby a substantially stress-free hollow body is formed.

8. The method of claim 7 wherein the infiltrant metal is selected from the group consisting of at least one of the metals nickel, cobalt and iron and heat resistant alloys based on at least one of these metals.

References Cited in the file of this patent

UNITED STATES PATENTS

| | | |
|---|---|---|
| 2,289,787 | Kaschke et al. | July 14, 1942 |
| 2,373,405 | Lowit | Apr. 10, 1945 |
| 2,696,434 | Bartlett | Dec. 7, 1954 |
| 2,698,990 | Conant et al. | Jan. 11, 1955 |

FOREIGN PATENTS

| | | |
|---|---|---|
| 694,203 | Great Britain | July 15, 1953 |